United States Patent
Yang et al.

(10) Patent No.: US 10,420,135 B2
(45) Date of Patent: Sep. 17, 2019

(54) PHYSICAL RANDOM ACCESS CHANNEL DESIGN IN ELAA

(71) Applicant: MEDIATEK INC., Hsinchu (TW)

(72) Inventors: Weidong Yang, San Diego, CA (US); Chien-Chang Li, Penghu County (TW); Bo-Si Chen, Keelung (TW); Yih-Shen Chen, Hsinchu County (TW)

(73) Assignee: HFI Innovation, HsinChu (TW)

( * ) Notice: Subject to any disclaimer, the term of this patent is extended or adjusted under 35 U.S.C. 154(b) by 86 days.

(21) Appl. No.: 15/474,094

(22) Filed: Mar. 30, 2017

(65) Prior Publication Data
US 2017/0303303 A1  Oct. 19, 2017

Related U.S. Application Data

(60) Provisional application No. 62/317,454, filed on Apr. 1, 2016.

(51) Int. Cl.
| | |
|---|---|
| H04W 72/12 | (2009.01) |
| H04L 5/00 | (2006.01) |
| H04W 56/00 | (2009.01) |
| H04W 72/04 | (2009.01) |
| H04W 74/08 | (2009.01) |

(52) U.S. Cl.
CPC ....... *H04W 72/1289* (2013.01); *H04L 5/0048* (2013.01); *H04W 56/0045* (2013.01);
(Continued)

(58) Field of Classification Search
CPC . H04W 16/14; H04W 72/0446; H04W 24/10; H04W 72/04; H04W 72/042
See application file for complete search history.

(56) References Cited

U.S. PATENT DOCUMENTS

| | | | |
|---|---|---|---|
| 8,295,850 B2 | 10/2012 | Vujcic | 455/450 |
| 2012/0281566 A1 | 11/2012 | Pelletier et al. | 370/252 |

(Continued)

FOREIGN PATENT DOCUMENTS

| | | |
|---|---|---|
| CN | 101873707 A | 4/2009 |
| CN | 103533663 A | 9/2013 |

(Continued)

OTHER PUBLICATIONS

Taiwan IPO, office action for the TW patent application 106111066 (no English translation is available) dated Feb. 26, 2018 (9 pages).
(Continued)

*Primary Examiner* — Jung H Park
(74) *Attorney, Agent, or Firm* — Imperium Patent Works; Zheng Jin (57) ABSTRACT

A physical random access channel (PRACH) waveform design to satisfy the requirements on the occupied channel bandwidth in eLAA wireless communications network is provided. In one alternative, PRACH comprises multiple segments in the time/frequency domain in one subframe. In another alternative, PRACH comprises multiple segments in the time/frequency domain across two or more subframes by using inter-subframe hopping. In one advantageous aspect, PDCCH triggers the dynamic allocation of the PRACH resource to facilitate the listen-before-talk (LBT) channel access procedure in unlicensed carriers. The aperiodic and dynamic allocation of PRACH resource improves efficiency and PRACH success rate.

17 Claims, 5 Drawing Sheets

(52) U.S. Cl.
CPC ..... *H04W 72/042* (2013.01); *H04W 72/0453* (2013.01); *H04W 74/0833* (2013.01); *H04W 74/0808* (2013.01); *H04W 74/0866* (2013.01)

(56) References Cited

U.S. PATENT DOCUMENTS

| | | | | |
|---|---|---|---|---|
| 2013/0016705 | A1* | 1/2013 | Zhang | H04L 5/0048 370/336 |
| 2014/0044108 | A1* | 2/2014 | Earnshaw | G01S 5/0063 370/336 |
| 2016/0036578 | A1 | 2/2016 | Malladi et al. | 370/329 |
| 2017/0223550 | A1 | 8/2017 | Takeda et al. | |
| 2018/0206269 | A1* | 7/2018 | Bhorkar | H04L 5/00 |
| 2018/0220458 | A1* | 8/2018 | Ouchi | H04J 11/00 |
| 2018/0255586 | A1* | 9/2018 | Einhaus | H04W 74/08 |
| 2018/0279365 | A1* | 9/2018 | Wang | H04W 74/0808 |

FOREIGN PATENT DOCUMENTS

| | | |
|---|---|---|
| WO | WO2016017355 A1 | 7/2014 |
| WO | WO2016019243 A1 | 7/2014 |

OTHER PUBLICATIONS

3GPP TSG RAN WG1 meeting #84 R1-160628, LG Electronics, "Random access in LAA", St Julian's, Malta, Feb. 15-19, 2016 (5 pages).

3GPP TSG RAN WG1 #84 R1-160568, Samsung, "Discussion on LBT for UL Grant", St Julian's, Malta, Feb. 15-19, 2016 (3 pages).

International Search Report and Written Opinion of International Search Authority for PCT/CN2017/079200 dated Jun. 21, 2017 (11 pages).

3GPP TSG RAN Meeting #70 RP-152272, Eriicsson et al., New Work Item on Enhanced LAA for LTE, Sitges, Spain dated Dec. 7-10, 2015 (8 pages).

ETSI EN 301 893 v1.8.0, "Broadband Radio Access Networks (BRAN); 5 GHz high performance RLAN; Harmonized EN covering the essential requirements of article 3.2 of the R&TTE Directive". (93 pages).

3GPP TSG RAN WG1 #81 R1-152790, Qualcomm Incorporated, Uplink Waveform for LAA, Fukuoka, Japan dated Apr. 25-29, 2015 (4 pages).

\* cited by examiner

PHYSICAL RANDOM ACCESS CHANNEL DESIGN IN ELAA

CROSS REFERENCE TO RELATED APPLICATIONS

This application claims priority under 35 U.S.C. § 119 from U.S. Provisional Application No. 62/317,454, entitled "PRACH Design in eLAA," filed on Apr. 1, 2016, the subject matter of which is incorporated herein by reference.

TECHNICAL FIELD

The disclosed embodiments relate generally to wireless network communications, and, more particularly, to physical random access channel (PRACH) design in licensed assisted access (LAA) wireless communications systems.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA". In such a solution, an established communication protocol such as Long Term Evolution (LTE) can be used over the licensed spectrum to provide a first communication link, and LTE can also be used over the unlicensed spectrum to provide a second communication link.

Furthermore, while LAA only utilizes the unlicensed spectrum to boost downlink through a process of carrier aggregation, enhanced LAA (eLAA) allows uplink streams to take advantage of the 5 GHz unlicensed band as well. Although eLAA is straightforward in theory, practical usage of eLAA while complying with various government regulations regarding the usage of unlicensed spectrum is not so straightforward. Moreover, maintaining reliable communication over a secondary unlicensed link requires improved techniques.

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random access channel (PRACH) is used for non-contention based RACH on an eLAA carrier.

In some countries, there are requirements on the occupied channel bandwidth for unlicensed carrier access. Specifically, the occupied channel bandwidth shall be between 80% and 100% of the declared nominal channel bandwidth. During an established communication, a device is allowed to operate temporarily in a mode where its occupied channel bandwidth may be reduced to as low as 40% of is nominal channel bandwidth with a minimum of 4 MHz. The occupied bandwidth is defined as the bandwidth containing 99% of the power of the signal. The nominal channel bandwidth is the widest band of frequencies inclusive of guard bands assigned to a single carrier (at least 5 MHz).

In LTE, various PRACH formats are defined, including PRACH formats 0-3 and PRACH format 4. In all cases, however, PRACH occupies contiguous frequency tones and takes roughly 1.08 MHz, which does not meet Europe's regulation on occupied channel bandwidth. Therefore, a PRACH waveform design to satisfy the requirements on the occupied channel bandwidth in eLAA wireless communications network is sought.

Furthermore, traditional PRACH resource in LTE is allocated periodically and statically. In eLAA, however, any downlink and uplink access has to follow a successful listen-before-talk (LBT) channel access procedure. As a result, a successful PRACH transmission happens only when the LBT for a downlink scheduler for the PRACH is successful as well as the LBT for PRACH itself is also successful at the allocated time. Since the success of LBT cannot be guaranteed, the PRACH transmission thus cannot be guaranteed. Therefore, a method of PRACH resource allocation is sought to facilitate uplink random access in unlicensed carriers.

SUMMARY

A physical random access channel (PRACH) waveform design to satisfy the requirements on the occupied channel bandwidth in eLAA wireless communications network is provided. In one alternative, PRACH comprises multiple segments in the time/frequency domain in one subframe. In another alternative, PRACH comprises multiple segments in the time/frequency domain across two or more subframes by using inter-subframe hopping. In one advantageous aspect, PDCCH triggers the dynamic allocation of the PRACH resource to facilitate the listen-before-talk (LBT) channel access procedure in unlicensed carriers. The aperiodic and dynamic allocation of PRACH resource improves efficiency and PRACH success rate.

In one embodiment, a base station performs a downlink listen before talk (LBT) channel access procedure in an orthogonal frequency division multiplexing (OFDM) wireless communications network. The base station transmits a physical layer signaling over a physical downlink control channel (PDCCH) to a user equipment (UE) upon the successful LBT procedure. The base station triggers physical random access channel (PRACH) resource to be allocated to the UE using the physical layer signaling. The base station receives a PRACH preamble from the UE over the allocated PRACH resource. The allocated PRACH resource is aperiodic and is triggered dynamically by the physical layer signaling.

In another embodiment, a user equipment (UE) receives a physical layer signaling over a physical downlink control channel (PDCCH) in an orthogonal frequency division multiplexing (OFDM) wireless communications network. The UE determines physical random access channel (PRACH) resource to be allocated to the UE based on the physical layer signaling. The UE performs an uplink listen before talk (LBT) channel access procedure by the UE to gain uplink channel access. The UE transmits a PRACH preamble to the base station over the allocated PRACH resource upon the successful LBT procedure. The allocated PRACH resource is aperiodic and is triggered dynamically by the physical layer signaling.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
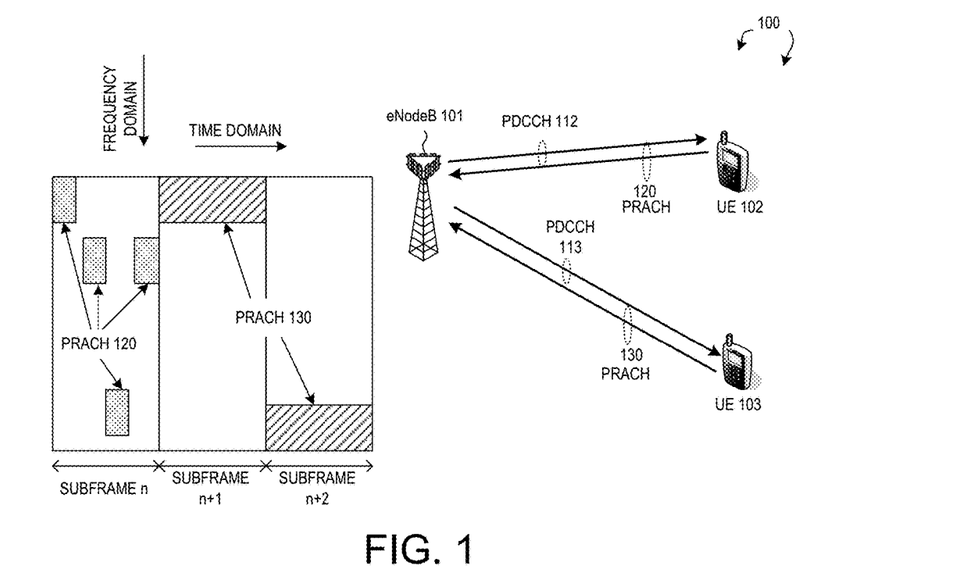
FIG. 1 illustrates a wireless communications system with physical random access channel (PRACH) design in extended licensed assisted access (eLAA) in accordance with a novel aspect.

FIG. 1 illustrates a wireless communications system 100 with physical random access channel (PRACH) design in extended licensed assisted access (eLAA) in accordance with a novel aspect. Mobile communication network 100 is an OFDM/OFDMA system comprising a base station eNodeB 101 and a plurality of user equipments including UE 102 and UE 103. In 3GPP LTE systems based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into physical resource blocks (PRBs), where each PRB consists of 12 consecutive subcarriers in one slot. In one example, the nominal channel bandwidth is 20 MHz, occupied with 100 PRBs of 18 MHz plus guard bands.

When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling. Furthermore, physical random access channel (PRACH) is used by the UE to establish connection with the base station.

Licensed Assisted Access (LAA) has been proposed to meet the exponential increase in communication demand. In LAA, a combination of licensed spectrum and unlicensed spectrum is used. An established communication protocol such as Long Term Evolution (LTE) can be used over the licensed spectrum to provide a first communication link, and LTE can also be used over the unlicensed spectrum to provide a second communication link. Furthermore, while LAA only utilizes the unlicensed spectrum to boost downlink through a process of carrier aggregation, enhanced LAA (eLAA) allows uplink streams to take advantage of the 5 GHz unlicensed band as well. For unlicensed carrier access, however, there are requirements on the occupied channel bandwidth in some countries. Specifically, the occupied channel bandwidth shall be between 80% and 100% of the declared nominal channel bandwidth. As a result, the legacy PUCCH/PUSCH and PRACH designs in LTE may not meet such requirements.

In the example of FIG. 1, eNodeB 101 transmits PDCCH 112 to UE 102 and PRACH 120 is allocated for UE 102 for uplink random access. The radio resources for PRACCH 120 need to be spread across the frequency domain to satisfy the requirements on the occupied channel bandwidth. In the example of PRACH 120, it comprises multiple segments in the time/frequency domain in one subframe (e.g., subframe n), and each segment uses the PRACH format 4 waveform as a building block. Similarly, eNodeB 101 transmits PDCCH 113 to UE 103 and PRACH 130 is allocated for UE 102 for uplink random access. The radio resources for PUCCH 130 also need to be spread across the frequency domain to satisfy the requirements on the occupied channel bandwidth. In the example of PRACH 130, it comprises multiple segments in the time/frequency domain across two or more subframes (e.g., subframe n+1 and subframe n+2) by using inter-subframe hopping. Each segment can be based on PRACH format 0 with some modifications. In one advantageous aspect, the PDCCH scheduler triggers aperiodic and dynamic allocation of the PRACH resource to facilitate the listen-before-talk (LBT) channel access procedure in unlicensed carriers.

Figure 2:
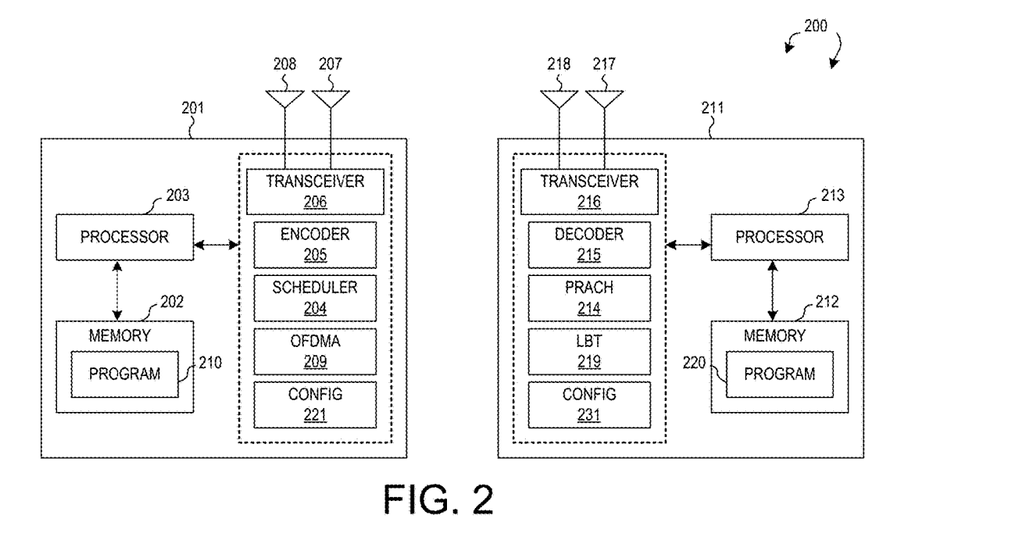
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a scheduler 204, an OFDMA module 209, and a configuration circuit 221. Wireless device 211 is a receiving device that includes a decoder 215, a PRACH circuit 214, an LBT circuit 219, and a configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the transmitting device (a base station) configures radio resource (PRACH) for UEs via configuration circuit 221, schedules downlink and uplink transmission for UEs via scheduler 204, encodes data packets to be transmitted via encoder 205 and transmits OFDM radio signals via OFDM module 209. The receiving device (a user equipment) obtains allocated radio resources for PRACH via configuration circuit 231, receives and decodes downlink data packets via decoder 215, and transmits random access preambles over the PRACH resource via PRACH circuit 214 after successfully gain the channel access via LBT circuit 219.

In LTE, PRACH formats 0-3 are defined as a Zadoff-Chu (ZC) sequence with 839-point and a carrier spacing at 1.25 KHz. In contrast, PRACH format 4 is defined as a ZC sequence with 139-point and a carrier spacing at 7.5 KHz. In all cases, PRACH occupies contiguous frequency tones and takes roughly 1.08 MHz, which obviously does not meet Europe's regulation on occupied channel bandwidth. From the consideration that interlaced PUSCH needs to be introduced in eLAA, the uplink spectrum is rather fragmented. If PRACH needs to share resource with PUSCH, then it seems necessary to define PRACH on resource interlaces. If sequence design over one or more resource interlaces which leads to a good timing resolution can be identified, then that leads to a solution compatible with the design for PUSCH/PUCCH.

Figure 3:
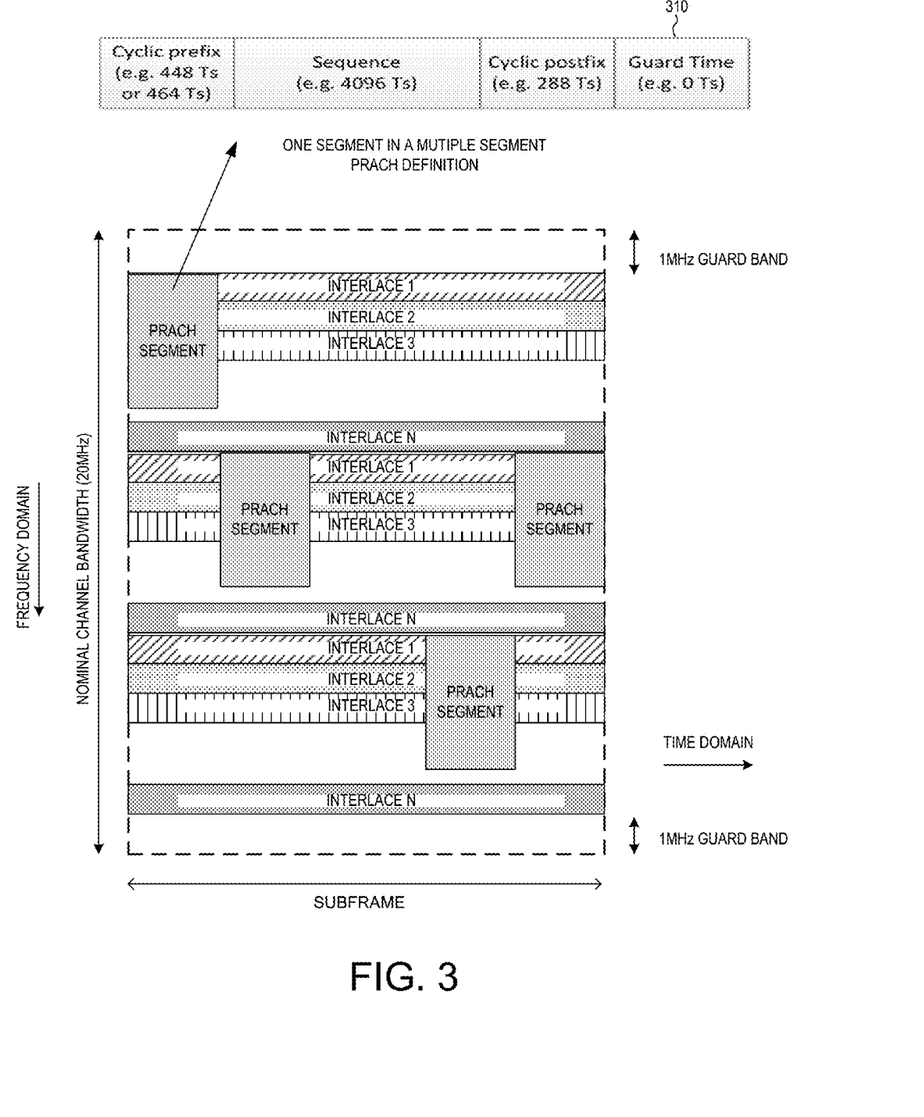
FIG. 3 illustrates a first embodiment of PRACH design with multiple segments.

FIG. 3 illustrates a first embodiment of PRACH design with multiple segments. In the case that placing PRACH over selected resource interlaces is difficult, a PRACH for eLAA design (referred to as LAA-PRACH) with multiple segments in the time/frequency domain in a subframe is considered. Each segment uses the PRACH format 4 waveform as a building block. In one subframe, multiple occasions of the PRACH format 4 waveform transmissions in both time and frequency can be used. The benefits of using PRACH format 4 waveform include specification effort and leverage of existing implementation.

In FIG. 3, one segment of the LAA-PRACH is shown by 310. One segment is used to take two OFDM symbols, as the first OFDMA symbol in a slot is longer than the rest symbols in the slot, depending what symbols are covered by one segment, the duration of one segment can be slightly different, e.g. a segment over symbols 0 and 1 uses a cyclic prefix at 464 Ts and a segment over symbols 2 and 3 uses a cyclic prefix at 448 Ts. In total, 7 segments can be used to cover the 14 OFDMA symbols in a subframe. The sequence to generate a segment can be the 139-point ZC sequence as used in PRACH format 4.

To meet the occupied channel bandwidth requirements, frequency hopping is applied to segments in a subframe so they can be spread in the channel bandwidth. The frequency hopping pattern can be generated according to Cell-ID, slot index, channel bandwidth, and the number of resource interlaces in the channel bandwidth. If putting segments at the top and at the bottom of the channel bandwidth is enough to meet the occupied channel bandwidth requirements (e.g. segments 1, 3, 5, 7 sit at the top, segments 2, 4, 6 sit at the bottom), such a solution should be considered. In the design of the frequency hopping patterns, two approaches can be taken: in one approach, segments are placed on a small number of resource interlaces so eNB can handle interference more effectively by scheduling robust MCS levels to affected UEs. In another approach, segments are spread out over as many resource interlaces as possible so to randomize the interference. To avoid interference to PUSCH's DMRS, depending on the channel access assumption for PRACH, it may be possible to leave some gaps in the time domain between segments, e.g. symbols with DMRS (i.e. symbols 3 and 10 in each subframe) are skipped over, only 5 segments to cover symbols $\{0, 1\}$, $\{4, 5\}$, $\{6, 7\}$, $\{8, 9\}$, $\{12, 13\}$ in a subframe. The LAA-PRACH duration is up to one millisecond in this embodiment.

Figure 4:
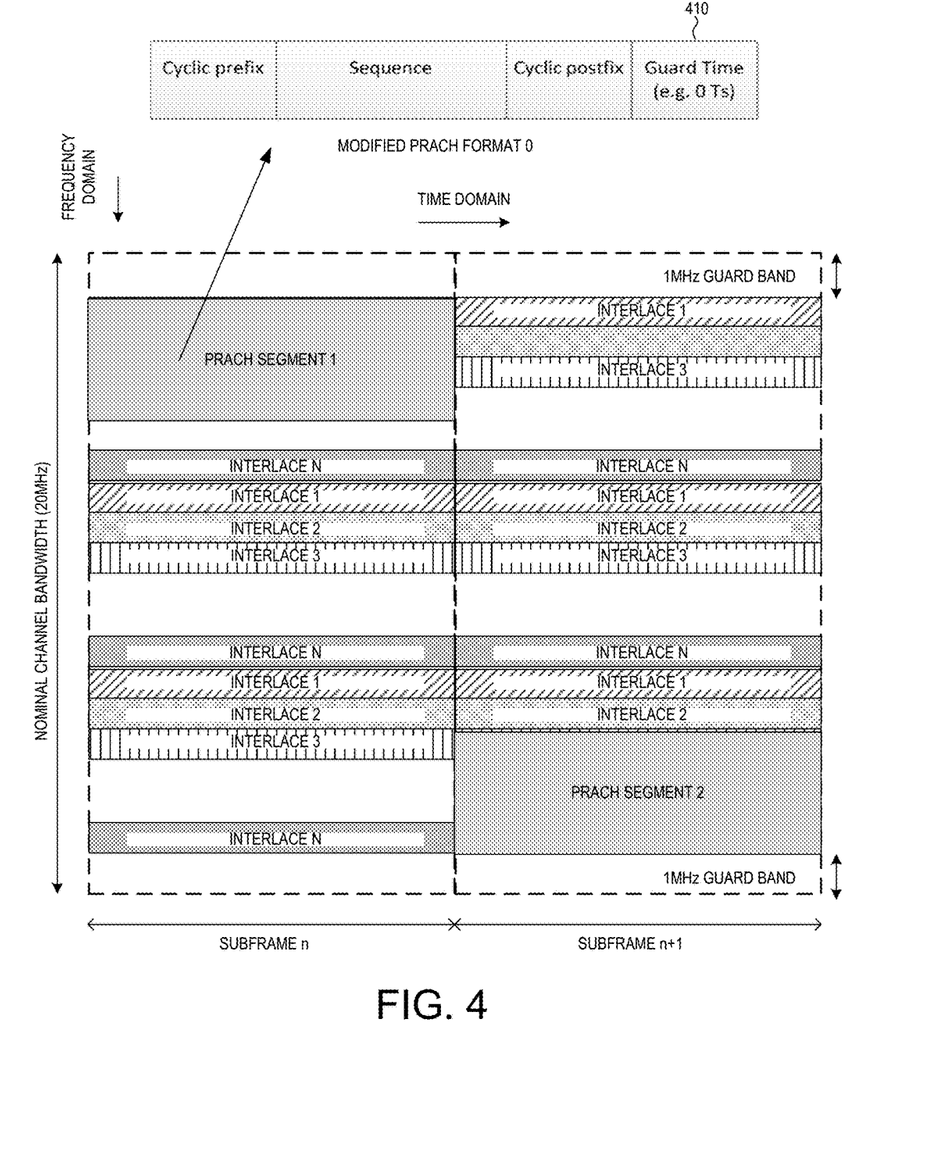
FIG. 4 illustrates a second embodiment of PRACH design with multiple segments and inter-subframe hopping.

FIG. 4 illustrates a second embodiment of PRACH design with multiple segments and inter-subframe hopping. It is also possible to have an LAA-PRACH segment in two or more subframes by using inter-subframe hopping. This can be also treated as multiple segment transmission with each segment occupying a subframe. Each segment can be based on PRACH format 0 with some modification: as PRACH format 0's duration is less than one millisecond, adopting that without modification can lead to some clear channel assessment (CCA) issues. In FIG. 4, one segment of the LAA-PRACH is shown by 410. Cyclic postfix and guard time are added such that the LAA-PRACH segment duration is one millisecond. To meet the occupied channel bandwidth requirements, inter-subframe frequency hopping is applied to segments across multiple subframes so they can be spread in the channel bandwidth. For example, PRACH segment 1 is place on top of subframe n, and PRACH segment 2 is placed on bottom of subframe n+1.

In both embodiments, interference between LAA-PRACH and PUSCH/PUCCH can happen, then it is up to eNB to mitigate the interference, e.g. using advanced interference cancellation, scheduling UEs with robust MCS levels so PUSCH is insensitive to interference from PRACH, adopting power control for PUSCH so PUSCH's interference to LAA-PRACH is reduced.

In LTE, PRACH resources are configured for a cell through the system information block (SIB2) message and dedicated signaling, resources are statically and periodically partitioned among PUSCH/PUCCH and PRACH. In a PDCCH order, two parameters are provided by eNB: Preamble Index and PRACH Mask Index, which indicates the index of the PRACH resource to be used in a radio frame. Following the same design in LTE, if some periodic resources are set aside for PRACH in eLAA, then a successful PRACH transmission happens only when LBT for the PDCCH order happens to be successful as well as LBT for PRACH also happens to be successful at the right time.

There are four different categories of LBT for accessing a shared wireless medium. Category 1 (No LBT) means no LBT procedure is performed by the transmitting entity. Category 2 (LBT without random backoff) means the duration of time that the channel is sensed to be idle before the transmitting entity transmits is deterministic. For Category 3 (LBT with random backoff with a contention window of fixed size), the transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel. For Category 4 (LBT with random backoff with a contention window of variable size), the transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. Note that Category 4 LBT takes longer time and has lower success rate as compared to other faster LBT procedures.

It is observed that a first issue of the static and periodic partition of resources between PUSCH/PUCCH and PRACH on some subframes is efficiency. In addition, a second issue is that the timing relationship following the legacy LTE design reduces the success rate for PRACH. To address the second issue, one option is to configure many PRACH resources in a radio frame, so a PRACH resource can be determined at any subframe. This option does provide a solution for the second issue, yet it makes the situation even worse for the first issue. In accordance with one novel aspect, PRACH resources are determined according to the subframe index of a subframe where PRACH starts. If PRACH up to 1 millisecond is specified in eLAA, then PRACH resources can be defined for every subframe; if PRACH up to 2 milliseconds is specified, then PRACH resources can also be defined accordingly.

Figure 5:
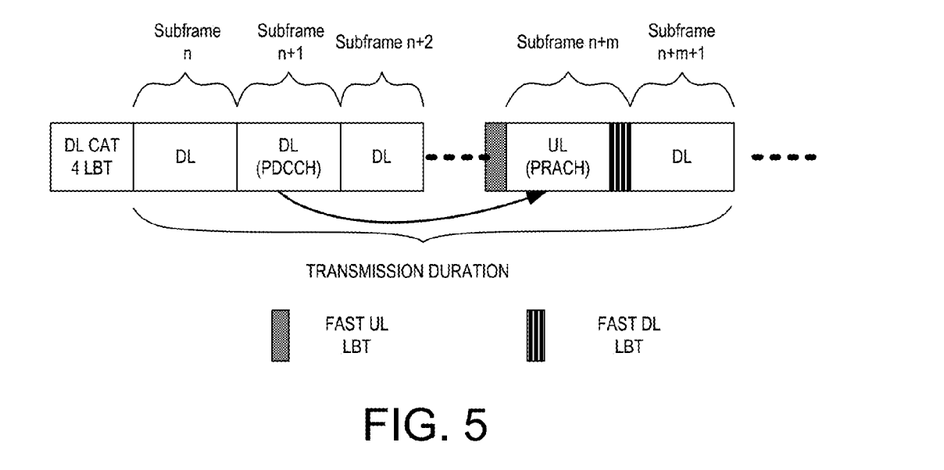
FIG. 5 illustrates PRACH resource determination with dynamic aperiodic PRACH resource allocation in eLAA in accordance with one novel aspect.

FIG. 5 illustrates PRACH resource determination with dynamic aperiodic PRACH resource allocation in eLAA in accordance with one novel aspect. In eLAA, a maximum channel occupancy time (MCOT) including DL transmission from one eNB and UL transmission to the same eNB is introduced. A transmission sequence is defined as a number of subframes including possible partial subframes for DL and/or UL within a MCOT. The transmission in the first subframe among the transmission sequence, which can be over a partial subframe, is conducted after a Category 4 LBT. The node performing the Category 4 LBT can be either an eNB or a UE. A sequence of transmission including DL and/or UL can follow the transmission on the first subframe. The transmission sequence within the MCOT can be initiated by either a DL transmission or an UL transmission. The duration of a transmission sequence is called transmission duration. After the first subframe in a transmission sequence, LBT for another transmission should be faster compared to the Category 4 LBT, e.g., fast DL LBT and/or fast UL LBT. The fast LBT can be a Category 2 LBT or a one-shot CCA.

In the example of FIG. 5, the transmission sequence is initiated with a downlink transmission. The transmission on the first subframe n of the transmission sequence is for DL after performing a DL category 4 LBT by the base station. In subframe n, upon successful LBT, the base station transmits DL data. In subframe n+1, the base station transmits DL control over PDCCH, which triggers PRACH resource allocation. For example, the PRACH resource is allocated in subframe n+m. Because subframe n+m is within the same transmission sequence, the UE only needs to perform a fast UL LBT such as a one-shot CCA procedure. Upon successful UL LBT, the UE then transmits a PRACH preamble to the base station in subframe n+m to establish connection. In accordance with one novel aspect, the PRACH resource is aperiodic and is created on the fly that can be triggered by either a dedicated PDCCH order or a field in a common PDCCH. The PRACH resource is allocated within the transmission duration so that the UE only needs to perform a fast LBT procedure. On the other hand, under the legacy static and periodic PRACH resource allocation, it is very likely that the next PRACH resource is located outside the transmission duration. As a result, the UE needs to perform a Category 4 LBT.

Figure 6:
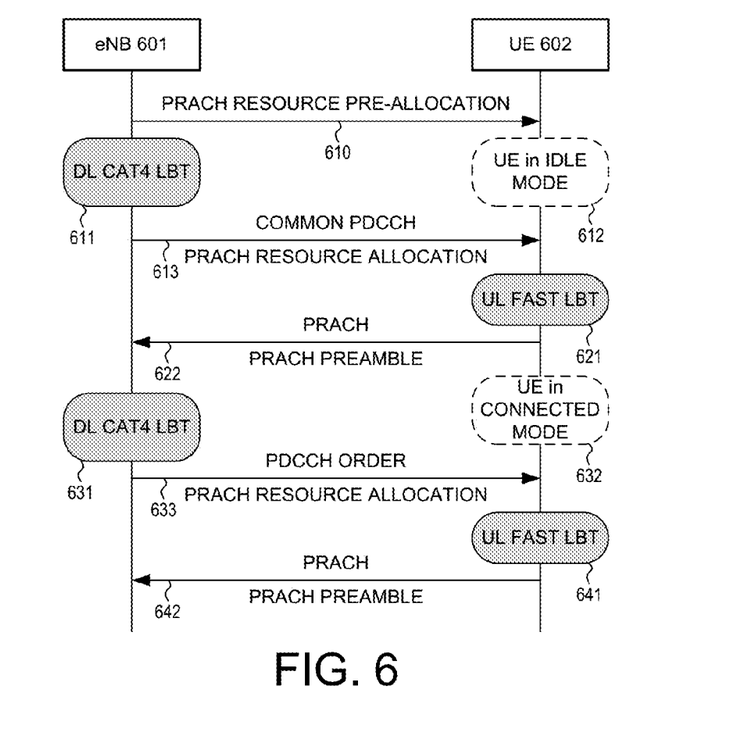
FIG. 6 illustrates a sequence flow between a base station and a user equipment for PRACH resource allocation and determination in eLAA.

FIG. 6 illustrates a sequence flow between a base station eNB 601 and a user equipment UE 602 for PRACH resource allocation and determination in eLAA. In step 610, eNB 601 pre-configures PRACH resource to UE 602. The pre-configuration can include the ZC sequence root sequence index, size of zero correlation zone, and frequency hopping patterns according to embodiments illustrated in FIG. 3 or FIG. 5, including locations for PRACH segments in the time/frequency domain. In a first example, in step 611, eNB 601 performs a DL category 4 LBT. Assume that UE 602 is in idle mode (step 612). In step 613, eNB 601 transmits a common PDCCH, which triggers PRACH resource allocation within the same transmission duration. In step 621, UE 602 performs an UL fast LBT. In step 622, UE 602 transmits a PRACH preamble based on the PRACH pre-configuration over the dynamically allocated PRACH resource. In a second example, in step 631, eNB 601 performs a DL category 4 LBT. Assume that UE 602 is in connected mode (step 632). In step 633, eNB 601 transmits a dedicated PDCCH order, which triggers PRACH resource allocation within the same transmission duration. In step 641, UE 602 performs an UL fast LBT. In step 642, UE 602 transmits a PRACH preamble based on the PRACH pre-configuration over the dynamically allocated PRACH resource.

Figure 7:
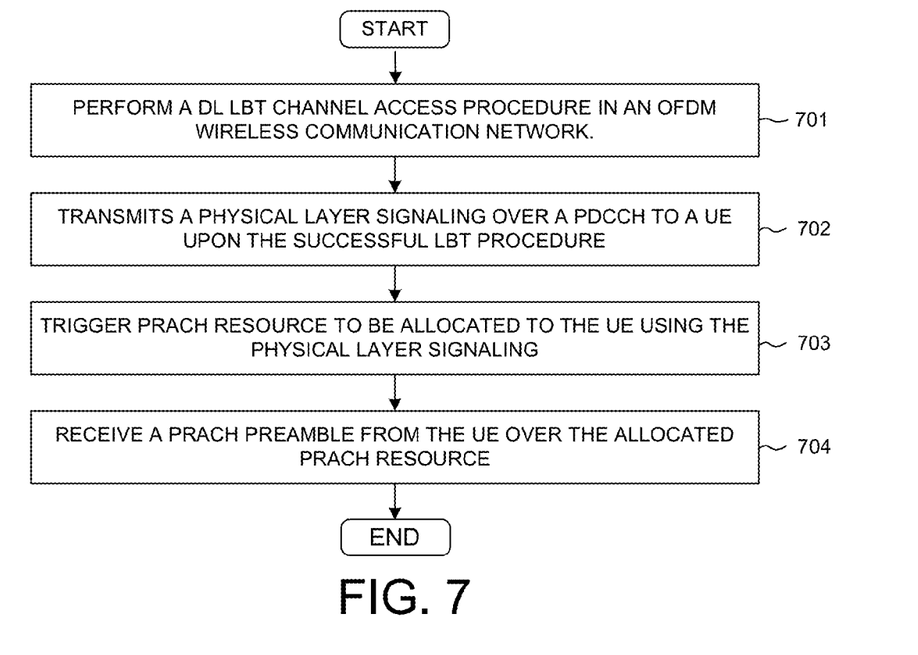
FIG. 7 is flow chart of a method of PRACH resource allocation from base station perspective in eLAA in accordance with one novel aspect.

FIG. 7 is flow chart of a method of PRACH resource allocation from base station perspective in eLAA in accordance with one novel aspect. In step 701, a base station performs a downlink listen before talk (LBT) channel access procedure in an orthogonal frequency division multiplexing (OFDM) wireless communications network. In step 702, the base station transmits a physical layer signaling over a physical downlink control channel (PDCCH) to a user equipment (UE) upon the successful LBT procedure. In step 703, the base station triggers physical random access channel (PRACH) resource to be allocated to the UE using the physical layer signaling. In step 704, the base station receives a PRACH preamble from the UE over the allocated PRACH resource. The allocated PRACH resource is aperiodic and is triggered dynamically by the physical layer signaling.

Figure 8:
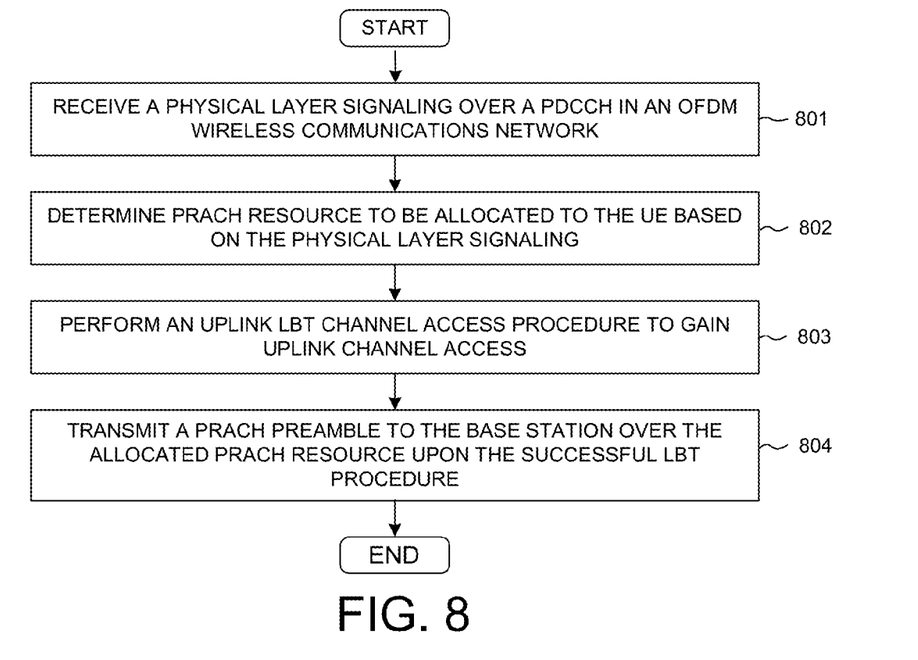
FIG. 8 is a flow chart of a method of PRACH resource determination from UE perspective in eLAA in accordance with one novel aspect.

FIG. 8 is a flow chart of a method of PRACH resource determination from UE perspective in eLAA in accordance with one novel aspect. In step 801, a user equipment (UE) receives a physical layer signaling over a physical downlink control channel (PDCCH) in an orthogonal frequency division multiplexing (OFDM) wireless communications network. In step 802, the UE determines physical random access channel (PRACH) resource to be allocated to the UE based on the physical layer signaling. In step 803, the UE performs an uplink listen before talk (LBT) channel access procedure by the UE to gain uplink channel access. In step 804, the UE transmits a PRACH preamble to the base station over the allocated PRACH resource upon the successful LBT procedure. The allocated PRACH resource is aperiodic and is triggered dynamically by the physical layer signaling.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
performing a downlink listen before talk (LBT) channel access procedure by a base station in an orthogonal frequency division multiplexing (OFDM) wireless communications network;
transmitting a physical layer signaling over a physical downlink control channel (PDCCH) to a user equipment (UE) upon the successful LBT procedure that gains a channel over a maximum channel occupancy time;
triggering physical random access channel (PRACH) resource to be allocated to the UE within the maximum channel occupancy time using the physical layer signaling; and
receiving a PRACH preamble from the UE over the allocated PRACH resource, wherein the PRACH resource comprises multiple segments across multiple subframes to occupy a predefined percentage of a channel bandwidth, and wherein each segment uses a modified PRACH format 0 waveform having an extended time duration of one subframe.

2. The method of claim 1, wherein the physical layer signaling is a dedicated PDDCH order for the UE in Radio Resource Control (RRC) connected mode.

3. The method of claim 1, wherein the physical layer signaling is a common PDCCH for the UE in Radio Resource Control (RRC) idle mode.

4. The method of claim 1, wherein the allocated PRACH resource is aperiodic and is triggered dynamically by the physical layer signaling.

5. The method of claim 1, wherein the base station pre-configures the PRACH with configuration information comprising at least one of a PRACH sequence root index, a size of zero correlation zone, and frequency hopping parameters.

6. The method of claim 1, wherein the PRACH resource comprises multiple segments in a subframe to occupy a predefined percentage of a channel bandwidth, and wherein each segment uses a PRACH format 4 waveform.

7. The method of claim 6, wherein the base station pre-configures locations of the multiple segments of the PRACH resource.

8. A method, comprising:
receiving a physical layer signaling over a physical downlink control channel (PDCCH) by a user equipment (UE) in an orthogonal frequency division multiplexing (OFDM) wireless communications network;
determining physical random access channel (PRACH) resource to be allocated to the UE within a maximum channel occupancy time based on the physical layer signaling;
performing an uplink listen before talk (LBT) channel access procedure by the UE to gain an uplink channel, wherein the uplink LBT procedure is a one-shot LBT procedure performed within the maximum channel occupancy time gained by the base station; and
transmitting a PRACH preamble to the base station over the allocated PRACH resource upon the successful LBT procedure, wherein the PRACH resource comprises multiple segments across multiple subframes to occupy a predefined percentage of a channel bandwidth, and wherein each segment uses a modified PRACH format 0 waveform having an extended time duration of one subframe.

9. The method of claim 8, wherein the physical layer signaling is a dedicated PDDCH order for the UE in Radio Resource Control (RRC) connected mode.

10. The method of claim 8, wherein the physical layer signaling is a common PDCCH for the UE in Radio Resource Control (RRC) idle mode.

11. The method of claim 8, wherein the allocated PRACH resource is aperiodic and is triggered dynamically by the physical layer signaling.

12. The method of claim 8, wherein the UE is pre-configured for the PRACH with configuration information comprising at least one of a PRACH sequence root index, a size of zero correlation zone, and frequency hopping parameters.

13. A user equipment (UE), comprising:
a receiver that receives a physical layer signaling over a physical downlink control channel (PDCCH) by a user equipment (UE) in an orthogonal frequency division multiplexing (OFDM) wireless communications network;
a physical random access channel (PRACH) handling circuit that determines PRACH resource to be allocated to the UE within a maximum channel occupancy time based on the physical layer signaling;
a channel access circuit that performs an uplink listen before talk (LBT) channel access procedure to gain an uplink channel, wherein the uplink LBT procedure is a one-shot LBT procedure performed within the maximum channel occupancy time gained by the base station; and
a transmitter that transmits a PRACH preamble to the base station over the allocated PRACH resource upon the successful LBT procedure, wherein the PRACH resource comprises multiple segments across multiple subframes to occupy a predefined percentage of a channel bandwidth, and wherein each segment uses a modified PRACH format 0 waveform having an extended time duration of one subframe.

14. The UE of claim 13, wherein the physical layer signaling is a dedicated PDDCH order for the UE in Radio Resource Control (RRC) connected mode.

15. The UE of claim 13, wherein the physical layer signaling is a common PDCCH for the UE in Radio Resource Control (RRC) idle mode.

16. The UE of claim 13, wherein the allocated PRACH resource is aperiodic and is triggered dynamically by the physical layer signaling.

17. The UE of claim 13, wherein the UE is pre-configured for the PRACH with configuration information comprising at least one of a PRACH sequence root index, a size of zero correlation zone, and frequency hopping parameters.

\* \* \* \* \*